United States Patent
Shao et al.

(10) Patent No.: US 9,582,180 B2
(45) Date of Patent: Feb. 28, 2017

(54) AUTOMATED TOUCH SCREEN ZOOM

(71) Applicant: VMware, Inc., Palo Alto, CA (US)

(72) Inventors: Wenlong Shao, Beijing (CN); Yueting Zhang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 379 days.

(21) Appl. No.: 14/079,239

(22) Filed: Nov. 13, 2013

(65) Prior Publication Data

US 2015/0135126 A1 May 14, 2015

(51) Int. Cl.
*G06F 3/048* (2013.01)
*G06F 3/0488* (2013.01)

(52) U.S. Cl.
CPC ... *G06F 3/0488* (2013.01); *G06F 2203/04806* (2013.01)

(58) Field of Classification Search
None
See application file for complete search history.

(56) References Cited

U.S. PATENT DOCUMENTS

2009/0046110 A1\* 2/2009 Sadler ............... G06F 3/0488 345/660
2012/0013645 A1\* 1/2012 Hu .................. G06F 3/04886 345/667

\* cited by examiner

*Primary Examiner* — William Trapanese (57) ABSTRACT

Systems and techniques are described for automated zoom and selection of content on a touch screen device. A described technique includes receiving a first touch input contacting a touch screen display of a user device at a first position in a user interface presented at a first magnification, while continuing to receive the first touch input determining that a duration of the first touch input has exceeded a predetermined threshold duration, and increasing, based on determining that the duration of the first touch input has exceeded than the predetermined threshold duration, the magnification of the user interface to a second magnification, and performing an action based on the first touch input.

26 Claims, 9 Drawing Sheets

AUTOMATED TOUCH SCREEN ZOOM

BACKGROUND

This document relates to automatically increasing the magnification of a user interface.

A virtual machine is a software-based abstraction of a physical computer system. In general, any computer program that can be executed on a physical computer system can be executed in a virtual machine using virtualization software. Virtualization software is software that is logically interposed and interfaces with a virtual machine and a physical computer system. Each virtual machine is configured to execute an operating system and applications. A physical computer system, referred to herein as a host machine, can execute one or more virtual machines.

A remote desktop client is a computer program that communicates user interface information with a remote computer system. Generally, the user interface information includes display data, which is received from the remote computer system and displayed on the computer local to the user, and sends inputs generated by the user, e.g., inputs received from a mouse, keyboard, or touch screen, to the remote computer system. In this way, applications executing remotely from the user can be accessed and interacted with by the user.

SUMMARY

In general, one aspect of the subject matter described in this document can be embodied in a technique that includes receiving a first touch input contacting a touch screen display of a user device at a first position in a user interface presented at a first magnification, while continuing to receive the first touch input determining that a duration of the first touch input has exceeded a predetermined threshold duration, and increasing, based on determining that the duration of the first touch input has exceeded than the predetermined threshold duration, the magnification of the user interface to a second magnification, and performing an action based on the first touch input.

These and other aspects can optionally include one or more of the following features. In some implementations, increasing the magnification of the user interface to the second magnification comprises increasing the magnification of the user interface to the second magnification while maintaining the user interface approximately centered at the first position. The method may comprise determining that the first touch input is no longer being received, and in response, restoring the magnification of the user interface to the first magnification. The method may comprise determining, while the magnification of the user interface remains constant at the second magnification, that the first touch input has moved to a second position in the user interface, wherein performing the action based on the first touch input comprises interacting with content presented in the user interface at the second position.

In some implementations, performing the action based on the first touch input in the user interface comprises determining that the touch screen display is no longer receiving the first touch input, and performing a single left click action at a last position of the first touch input, wherein the last position is located in the user interface. The method may comprise determining that no additional touch input has been received, wherein performing the single left click action is based on determining that no additional touch input has been received. Performing the action based on the first touch input in the user interface may comprises receiving, while the magnification of the user interface remains constant at a predetermined maximum magnification and while receiving the first touch input, a second touch input in the user interface, and performing a right click action at a last position of the first touch input, wherein the last position is located in the user interface.

In some implementations, performing the action based on the first touch input in the user interface comprises determining that the touch screen display is no longer receiving the first touch input, receiving a second touch input of a second position in the user interface, determining that the second touch input has been received within a predetermined period of time after determining that the touch screen display is no longer receiving the first touch input, and performing a double left click action at the second position. The method may comprise determining that no additional touch input has been received, wherein performing the double left click action is based on determining that no additional touch input has been received. The user interface may comprise a movable content item at the second position. The method may comprise determining that the second touch input has moved to a third position in the user interface, and moving the movable content item from the second position to the third position.

In some implementations, the method comprises determining that the user interface includes selectable content in a portion of the user interface that includes the first position, wherein increasing the magnification of the user interface to the second magnification is based on determining that the user interface includes the selectable content in the portion. The user interface may comprise a user interface for a virtual machine executing remotely from the user device. Performing the action based on the first touch input may comprise sending first data that identifies the action to a server executing the virtual machine, receiving second data from the server indicating a change in content presented by the virtual machine, the change based on the action, and updating the user interface using the second data.

Particular embodiments of the subject matter described in this document can be implemented so as to realize one or more of the following advantages. In some implementations, automatically increasing the magnification of a user interface and performing an action based on touch input allows a user to more easily interact with the user interface and/or reduces the amount of input received from a user. In some implementations, automatically increasing the magnification of a user interface allows a user to more easily interact with a user interface designed for a large screen, e.g., a computer monitor, and presented on a smaller screen, e.g., a user interface presented by a remote desktop client on the user's mobile device.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a framework to automatically increase the magnification of content presented on a touch screen device, e.g., a mobile device or a tablet computer having a touch screen display.

For example, a user device having a touch screen display may receive a touch input from a user at a position in a user interface displayed on the touch screen display. Once the duration of the touch input exceeds a minimum threshold duration, the user device may increase the magnification of the user interface. When the user interface is magnified, the user may more easily select content in the user interface, e.g., when multiple different items are positioned close to each other in the user interface. For example, the user may be able to more easily select one of two adjacent menu items when the user interface has an increased magnification.

Figure 1:
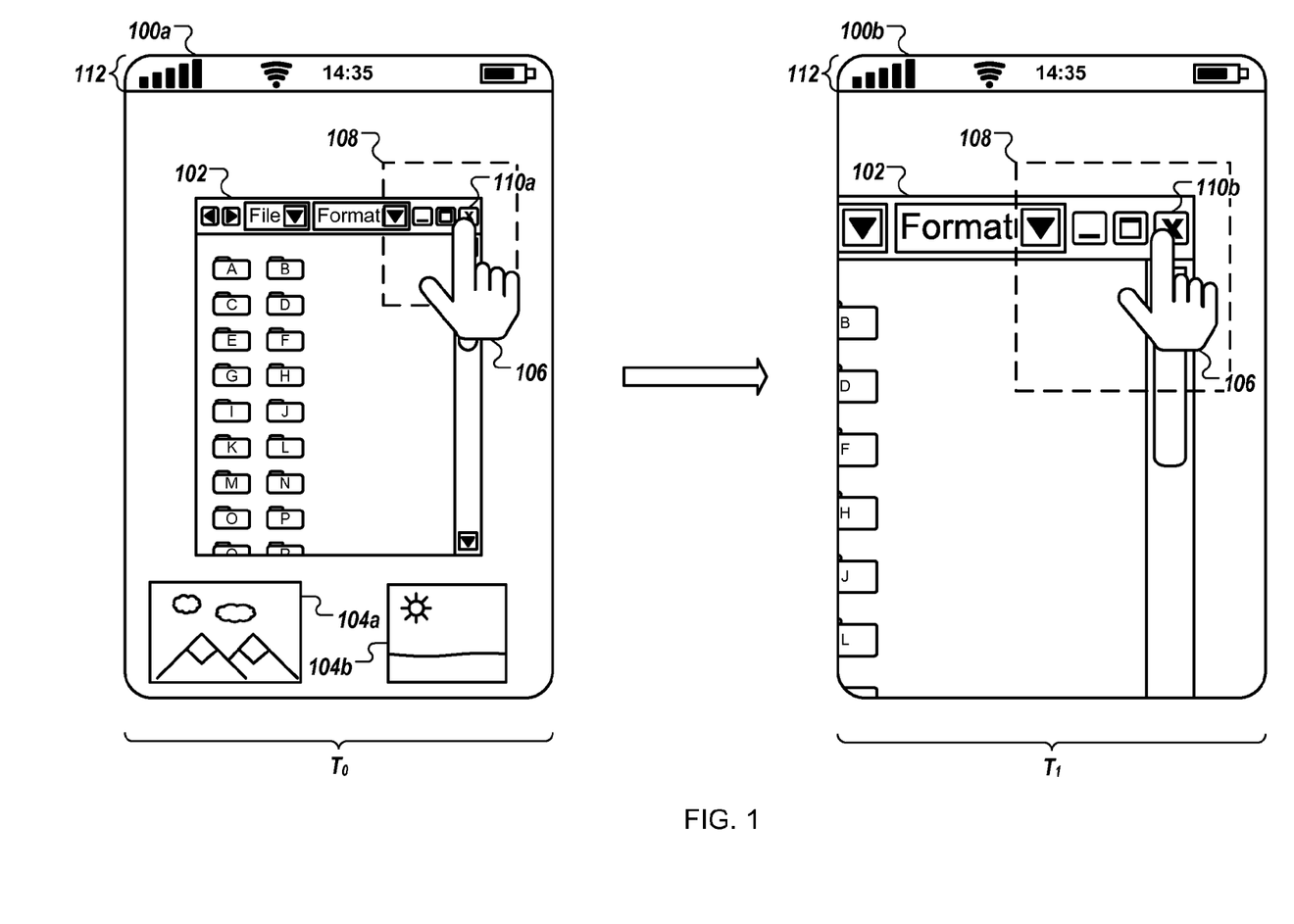
FIG. 1 shows example user interfaces presented on a touch screen display of a user device.

FIG. 1 shows example user interfaces 100*a* and 100*b* presented on a touch screen display of a user device. At time $T_0$, content in the user interface 100*a* is displayed at a first magnification. For example, the content may include an application window 102 and multiple images 104*a-b*.

In response to receiving a touch input 106, the user device identifies a position in the user interface 100*a* where the touch input 106 was received by the touch screen display. For example, a user may be trying to select a close application menu option 110*a* in the application window 102 where the size of the close application menu option 110*a* may make selection of the option difficult for the user.

At time $T_1$, the user device has determined that a current duration of the touch input 106 has exceeded a predetermined threshold duration, e.g., 0.2 seconds, and has automatically increased the magnification of the user interface 100*a* from a first magnification to a second magnification, e.g., from 100% to 160%, in the user interface 100*b*. In some implementations, the transition between the first magnification and the second magnification may be performed gradually over a predetermined time interval to make the experience appear visually smoother to the user, e.g., the user device may gradually "zoom in" around the area of the touch screen display underneath the user's finger.

The touch screen display presents, at time $T_1$, the content in the increased magnification user interface 100*b*, allowing the user to more easily interact with the content. In some implementations, the predetermined threshold duration may be between about 0.1 seconds and about 2 seconds, after which the increase in magnification can begin. Once the increase in magnification has begun, it may continue increasing for a predetermined time interval, after which the increase may reach its maximum magnification level. Once the increase in magnification has reached its maximum level, the magnification may remain at this level while the user's finger continues to contact the touch screen display.

When the user device detects that the user's finger is no longer contacting the touch screen display, the user device may restore the magnification to the original magnification, e.g., after a predetermined period of time, gradually, or immediately.

In the example illustrated in FIG. 1, the user has submitted a touch input interacting with a menu presented in the application window 102. For example, the close application menu option 110*b*, when presented in the increased magnification user interface 100*b*, has an increased size compared to when the close application menu option 110*a* is presented in the original magnification user interface 100*a* and may be easier for a user to select.

When the user device determines that the touch screen display is no longer receiving the touch input 106, the user device may determine that the user requested a single left click action, based on the touch input 106 and the position of the touch input 106 in the user interface 100*a*, and perform an associated action or task based on the determination. For example, the user device may perform a close application action that closes the application window 102.

In some implementations, upon determining that the touch screen display has not received another touch input for a predetermined period of time after the termination of the original touch input, the user device may return the magnification of the user interface to its original magnification. For example, the user device may present the original magnification user interface 100*a* after presenting the magnified user interface 100*b*.

In some implementations, before determining to increase the magnification of the user interface 100*a*, the user device may determine whether a portion 108 of the user interface 100*a* includes selectable content, e.g., content with which a user can interact, for example, a menu or a menu option. In these implementations, the user device may only increase the magnification if the portion includes some selectable content. For example, when the user device receives touch input in a portion that includes only the images 104*a-b*, the user device may determine that the portion does not include selectable content and keep the magnification of the original magnification user interface 100*a* constant.

Optionally, the determination of whether the portion 108 includes selectable content may include a determination of whether the portion 108 includes content that may be difficult for a user to interact with. For example, the user device may determine a presentation size of content presented in the portion 108 at the original magnification and whether the presentation size is less than a predetermined threshold size that may make it difficult for a user to select particular content presented in the portion. When the size is less than the predetermined threshold, the user may have difficulty selecting between two adjacent menu items and presentation of the increased magnification user interface 100*b* may allow the user to more easily select a particular menu item.

In some implementations, the user device increases the magnification of all content presented in a user interface, excluding user device information 112. In some implementations, the user device increases the magnification of a single application window or group of application windows based on the position of the touch input. For example, when the user device receives touch input in a portion of the user interface that presents a single application window, the user device may increase the magnification of only the single application window. In some examples, when the user device receives touch input with a position between two adjacent application windows, the user device may increase the magnification of the two adjacent application windows. In some implementations, the user device may increase the magnification of only the portion 108.

Figure 2:
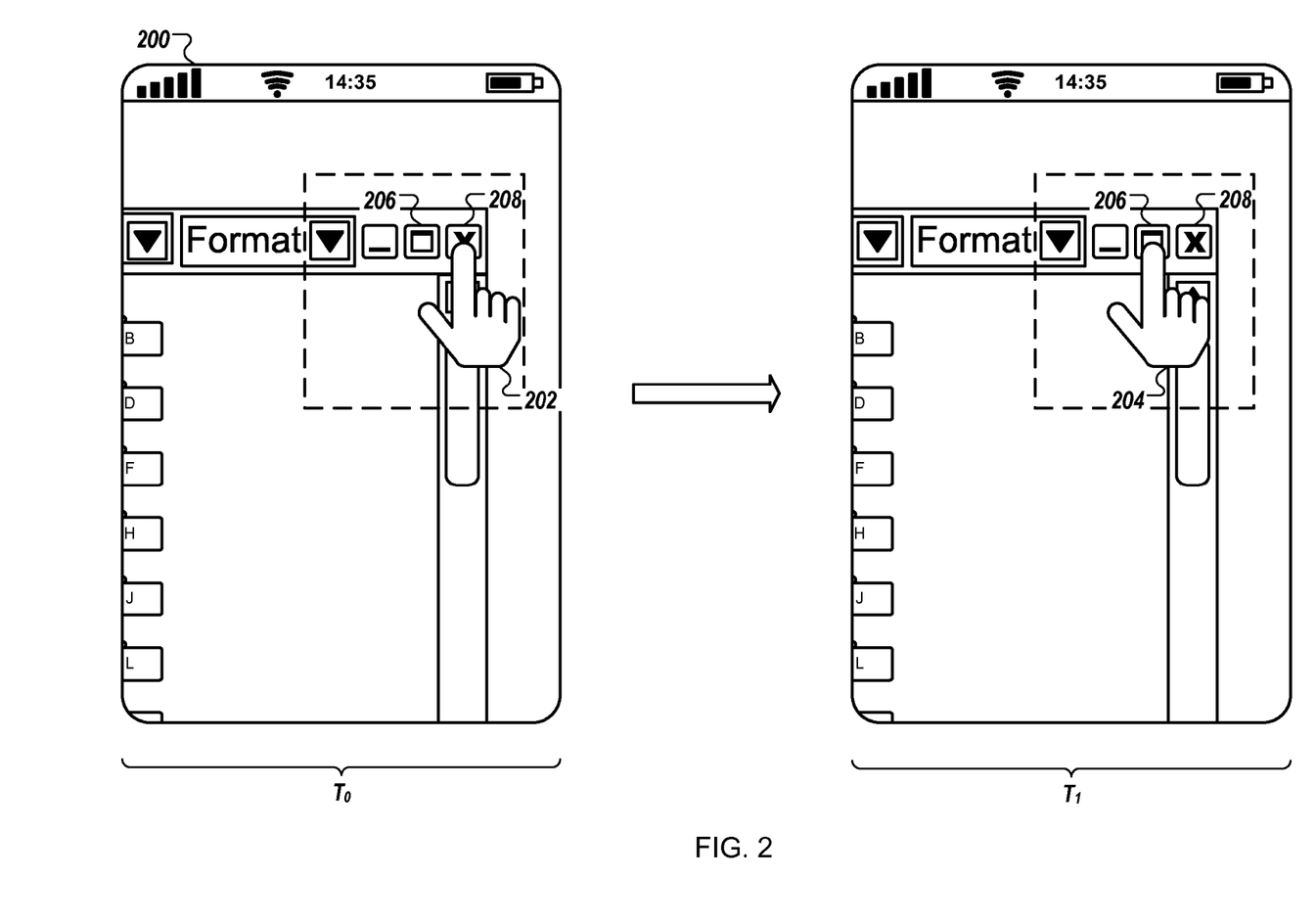
FIG. 2 shows an example of an increased magnification user interface presented on a touch screen display.

FIG. 2 shows an example of an increased magnification user interface 200 presented on a touch screen display. For example, the increased magnification user interface 200 may be the increased magnification user interface 100*b* shown in FIG. 1.

The increased magnification user interface 200 allows a user to move a touch input from a first position 202, at time $T_0$, to a second potion 204, at time $T_1$. For example, when the user interface 100*a* is initially presented, a user may have difficulty selecting a maximize window menu option 206 and may instead inadvertently position the touch input at a position in the user interface 100*a* that presents a close window menu option 208. Upon presentation of the increased magnification user interface 200, the user may move the touch input, while continuing to contact the touch screen display, from the first position 202 to the second position 204 to select the maximize window menu option 206.

The user device performs an action based on the final position of the touch input, e.g., the second position 204, in response to determining that the user is no longer contacting the touch screen display at the second position 204, i.e., in response to determining that the touch input is no longer being received. For example, the user device may perform a left click action at the second position 204 after the user removes their finger from the touch screen display.

Figure 3:
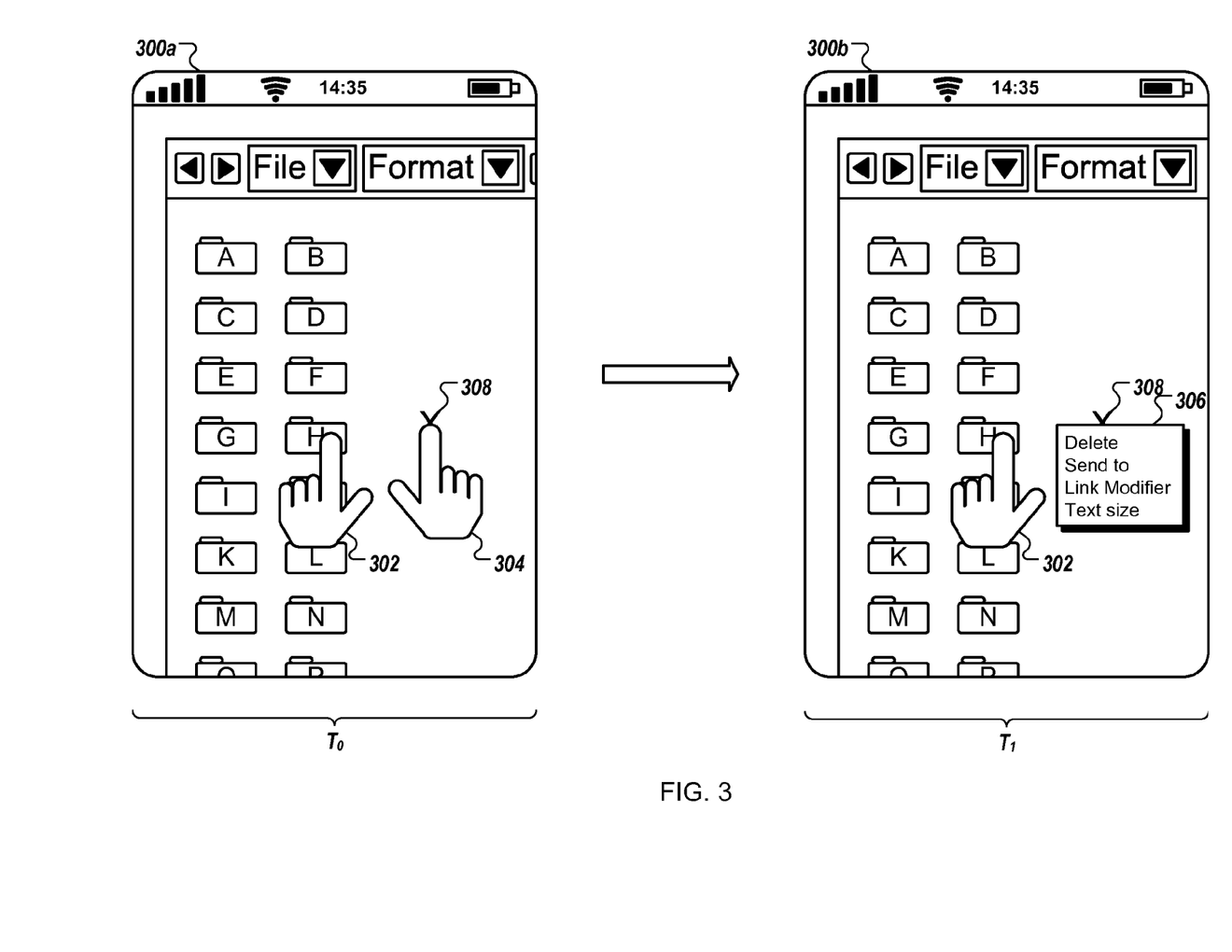
FIG. 3 shows an example of a touch screen display receiving input that corresponds to a right click action.

FIG. 3 shows an example of a touch screen display receiving input that corresponds to a right click action. The touch screen display presents a user interface 300*a* and, at time $T_0$, receives a first touch input 302 and a second touch input 304 at the same time, e.g., the touch screen display receives the second touch input 304 while continuing to receive the first touch input 302. For example, the first touch input may be similar to the touch input 106, described with reference to FIG. 1, and the user interface 300*a* may be an increased magnification user interface, e.g., the increased magnification user interface 100*b*.

The user device receives the first touch input 302 and increases the magnification of a user interface to the increased magnification user interface 300*a*. The user device determines that, at time $T_0$, the touch screen display has receive the second touch input 304 while continuing to receive the first touch input 302. At time T1, the user device determines that the second touch input 304 is no longer being received, and determines that receipt of the first touch input 302 and the second touch input 304 corresponds to a right click action, e.g., based on predetermined criteria that associate certain touch inputs or sequences of touch inputs with specific actions, and, in response, the touch screen display presents a right click menu 306 in the increased magnification user interface 300*b*.

The user device may position the right click menu 306 using a position of the first touch input 302 or a position 308 of the second touch input 304. As shown in FIG. 3, the position of the right click menu 306 is based on the position 308 of the second touch input 304.

The user device may present the right click menu 306 in the user interface 300*b* until receipt of additional touch input, either of a menu option presented in the right click menu 306 or another portion of the user interface 300*b*. Optionally, if no additional input is received for a predetermined period of time, the user device may remove the right click menu 306 from the user interface 300*b*.

Figure 4:
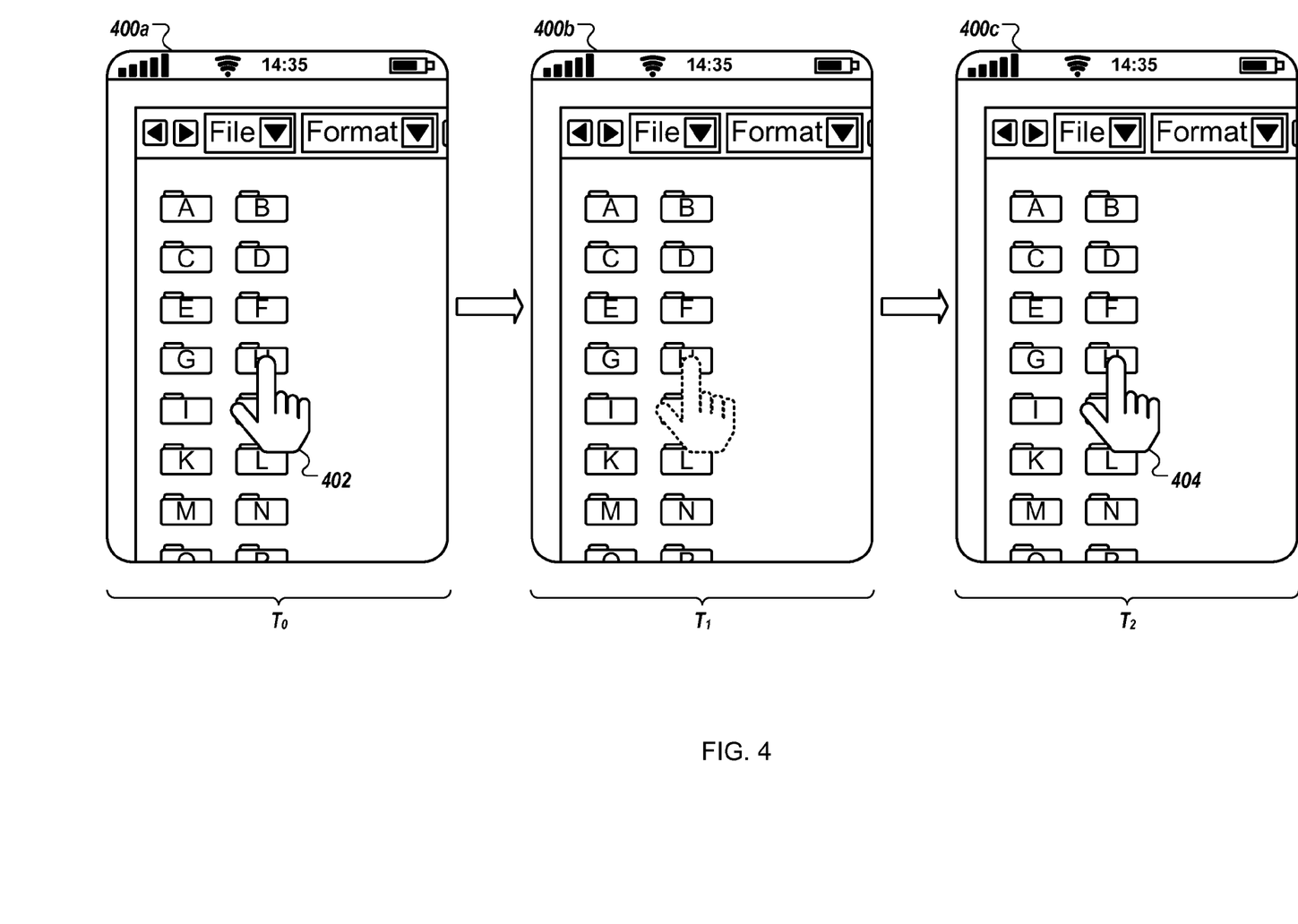
FIG. 4 shows an example of a touch screen display receiving input that corresponds to a double click action.

FIG. 4 shows an example of a touch screen display receiving input that corresponds to a double click action. The touch screen display presents, at time $T_0$, a user interface 400*a* and receives a first touch input 402. For example, the user device may present an original magnification user interface on the touch screen display, receive the first touch input 402, and present the increased magnification user interface 400*a* upon determining that the first touch input 402 has been received for a predetermined period of time.

During time period $T_1$, the user device detects an absence of the first touch input 402 from the touch screen display, and, at time $T_2$, the user device detects a second touch input 404 in approximately the same position of the touch screen display as the first touch input 402. Based on the receipt of the first touch input 402 and the second touch input 404, the user device determines that a user requested a double click action and performs the double click action, e.g., by using the sequence of the first touch input 402 and the second touch input 404 as input to a database that associates sequences of touch input with actions. In some implementations, if the user device determines that the second touch input was received within a predetermined distance from the first touch input, the user device determines that the user requested a double click action. For example, the predetermined distance may be between about 0.039 inches to about 0.394 inches or between about 0.118 inches to about 0.197 inches, e.g., between about 0.1 cm to about 1 cm or between about 0.3 cm to about 0.5 cm.

Optionally, the user device may determine that the second touch input 404 was received by the touch screen display within a predetermined threshold period of time, e.g., 0.3 seconds, after the first touch input 402 and perform a double left click action. For example, the user device may determine that the time $T_2$ occurred within the predetermined period of time after the time $T_0$. If the user device determines that the time $T_2$ occurred more than the predetermined period of time after the time $T_0$, the user device may determine that a double click action should not be performed. In some implementations, the predetermined threshold period of time is between about 0.1 and about 0.5 seconds or between about 0.2 and about 0.3 seconds.

The user device may perform the double click action based on the location of the first touch input 402 or the second touch input 404. For example, when the positions for the first touch input 402 and the second touch input 404 differ by more than a predetermined threshold distance, the user device may determine that the second touch input 404 is more likely to correspond with a position in the user interface 400*c* the user intended to select than the first touch input 402 and perform the double click action based on the position of the second touch input 404.

Figure 5:
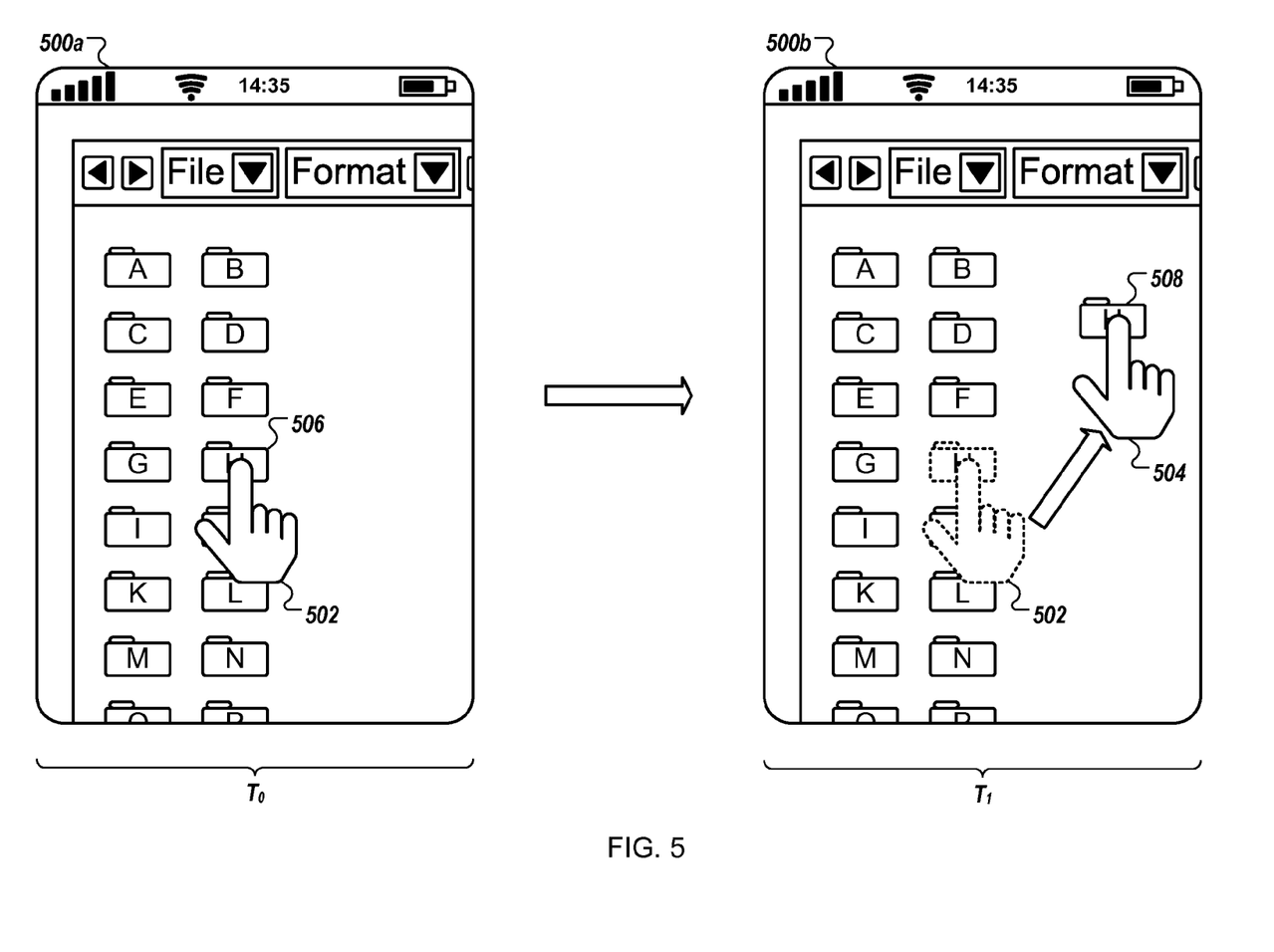
FIG. 5 shows an example of a touch screen display receiving input that corresponds with a move content action.

FIG. 5 shows an example of a touch screen display receiving input that corresponds with a move content action. The touch screen display presents a user interface 500*a*, at time $T_0$, and receives a touch input at a first position 502. The user interface 500*a* is an increased magnification user interface, similar to the increased magnification user interface 100*b*. At time T1, the user device determines that the touch input has moved to a second position 504, e.g., that the user has dragged their finger from position 502 to position 504.

Based on the movement of the touch input, the user device determines that the user requested a move content action, e.g., that the user device move the location of a folder presented in the user interface 500*a* from a first folder location 506, shown in the user interface 500*a*, to a second folder location 508, shown in the user interface 500*b*.

In some implementations, if the user device detects that the touch input is positioned near the edge of the user interface 500b, the user device may perform a scroll window action to present additional content in the user interface.

In some implementations, the user device may identify the move content action based on receipt of a double click action and then movement of the second touch input.

Figure 6:
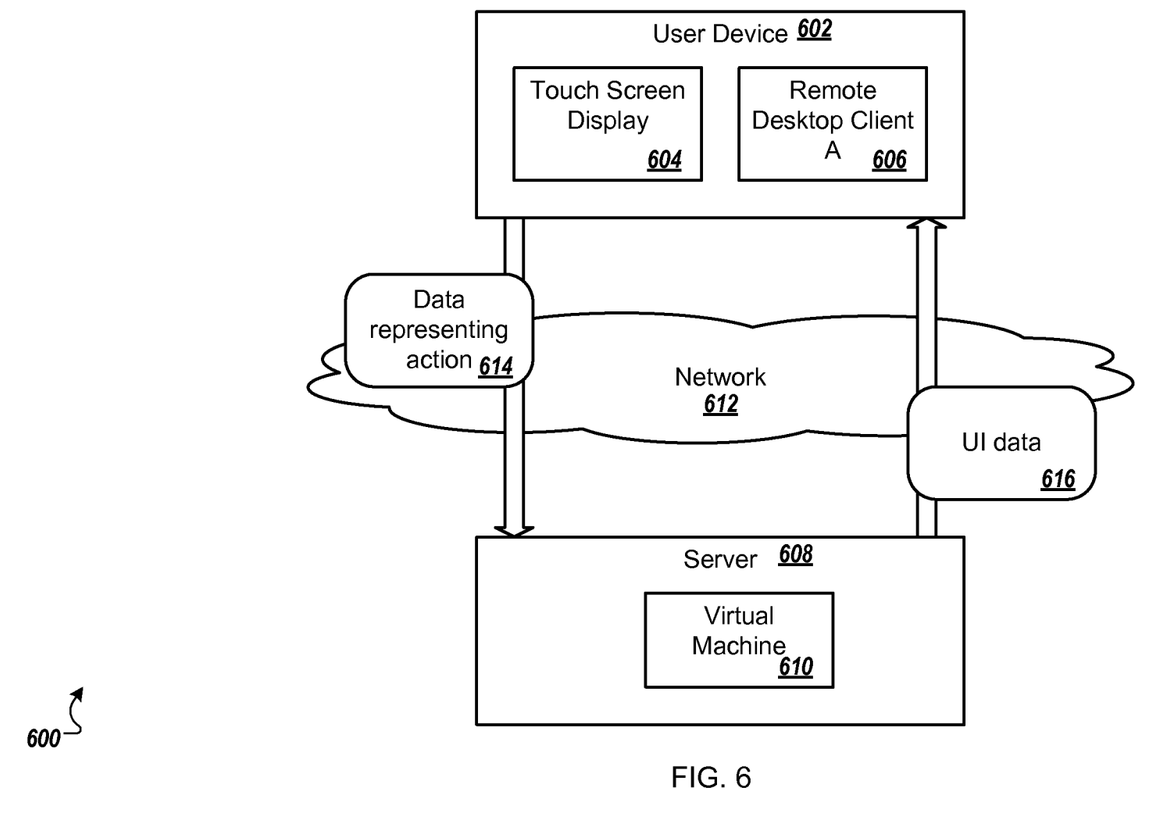
FIG. 6 shows an example architecture of an environment for presenting a remote desktop on a user device having a touch screen display.

FIG. 6 shows an example architecture of an environment 600 for presenting a remote desktop on a user device 602 having a touch screen display 604.

A remote desktop client A 606 executing on the user device 602 interacts with a virtual machine 610 executing on a server 608 over a network 612, e.g., using network connections included in the user device 602 and the server 608. In particular, when the user device 602 launches the remote desktop client A 606, the remote desktop client A 606 can transmit a request to the server 608 that identifies the virtual machine 610. In response, the server 608 can launch the virtual machine 610 and provide a user interface from the virtual machine 610 to the remote desktop client A 606 for presentation on the touch screen display 604.

The user interface presented by the remote desktop client A 606 may include content that is difficult for a user to interact with based on the display size of the touch screen display 604. When the remote desktop client A 606 presents the user interface and receives touch input submitted by a user through the touch screen display 604 that indicates user interaction with the user interface, the remote desktop client A 606 may determine whether the touch input has been received for more than a predetermined threshold period of time and may increase the magnification of the content presented in the user interface, e.g., as described above with reference to FIGS. 1-5 and below with reference to FIGS. 7A-B. The increase in the magnification of the content presented in the user interface may allow the user to more easily interact with the content presented in the user interface.

In some implementations, the remote desktop client A 606 determines the size of the touch screen display 604, e.g., by querying the operating system of the user device or another process executing on the user device in accordance with an Application Programming Interface (API) or by using another technique, and increases the magnification of the content presented in the user interface only when the size is less than a predetermined minimum size. For example, the remote desktop client A 606 may determine that the physical size of the touch screen display 604 corresponds with a size smaller than a tablet display size, e.g., has a diagonal smaller than 7 inches, and that the magnification of the content should be increased. In some examples, a user may be able to adjust the predetermined minimum size, e.g., as a user setting.

After receipt of touch input and the increase in the magnification of the user interface, the remote desktop client A 606 may identify an action that corresponds with the touch input and provide data identifying the action to the server 608. For example, the remote desktop client A 606 can determine that the user performed a right click action and send data 614 representing the right click action to the server. Some additional examples of actions may include a left click action, a double left click action, a move action, and so on.

The virtual machine 610 receives the data representing an action and executes an operation based on the action. For example, the virtual machine 610 may receive data identifying the last position of the touch input in the user interface and perform an operation based on the position. The action may, for example, select a menu, an option in a menu, launch an application on the virtual machine, or move the location of content.

The virtual machine 610 sends the remote desktop client A 606 user interface data 616 representing a change to the user interface based on the action and the remote desktop client A 606 updates the user interface accordingly. For example, when the action is a left click action for opening a menu, the remote desktop client A 606 presents the opened menu in the user interface using user interface data received from the virtual machine 610.

The user device 602 may be a personal computer, a mobile communication device, or other device that can send and receive data over the network 612 and include a touch screen display, a processor, and memory. The network 612 e.g., a local area network (LAN), wide area network (WAN), the Internet, or a combination thereof, connects the user device 602, and the server 608. In some implementations, the user device is a phone, such as a smart phone, or a tablet.

Figure 7A:
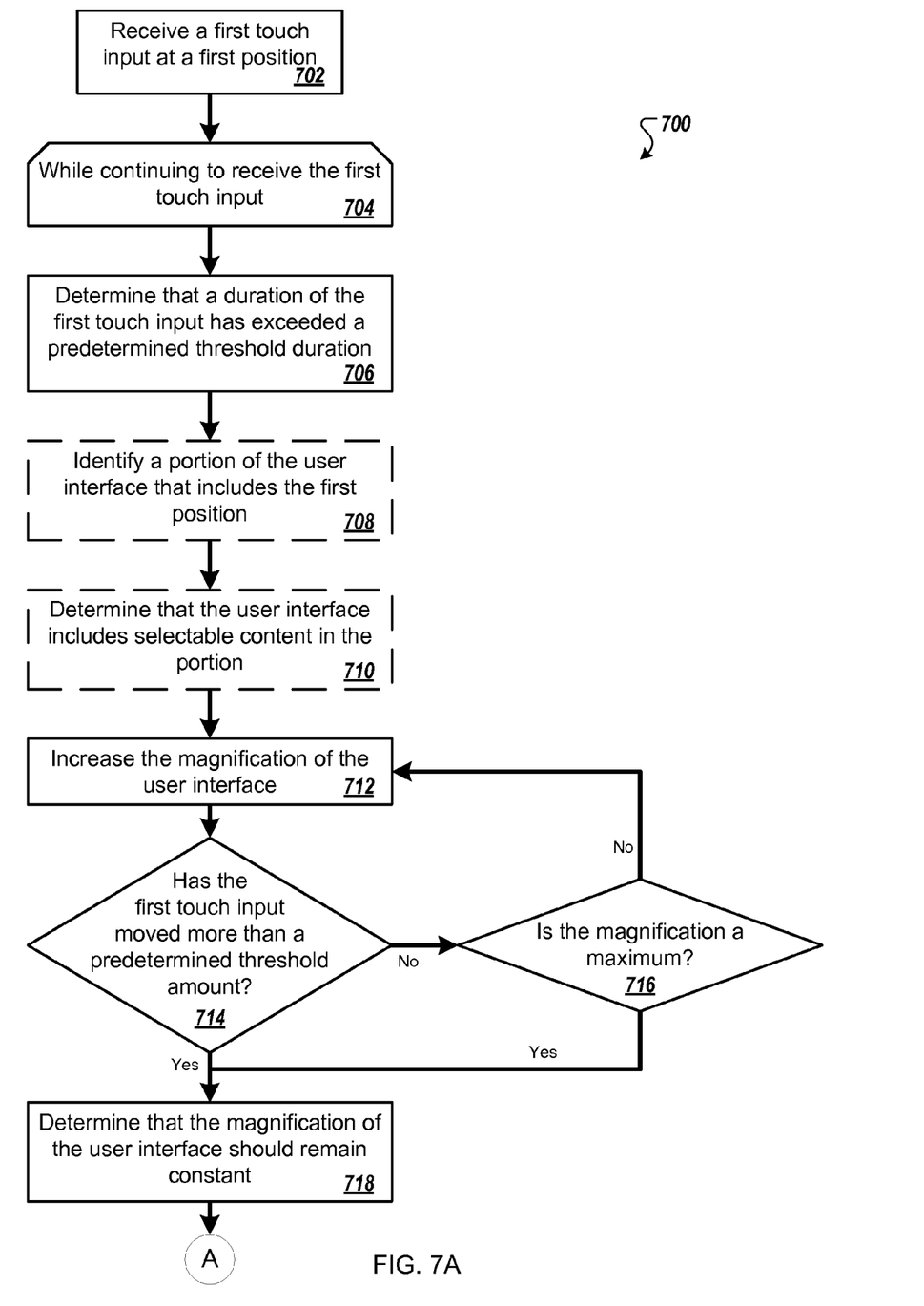
FIGS. 7A-B are a flow diagram of a process for increasing a magnification of a user interface and performing an action.
Figure 7B:
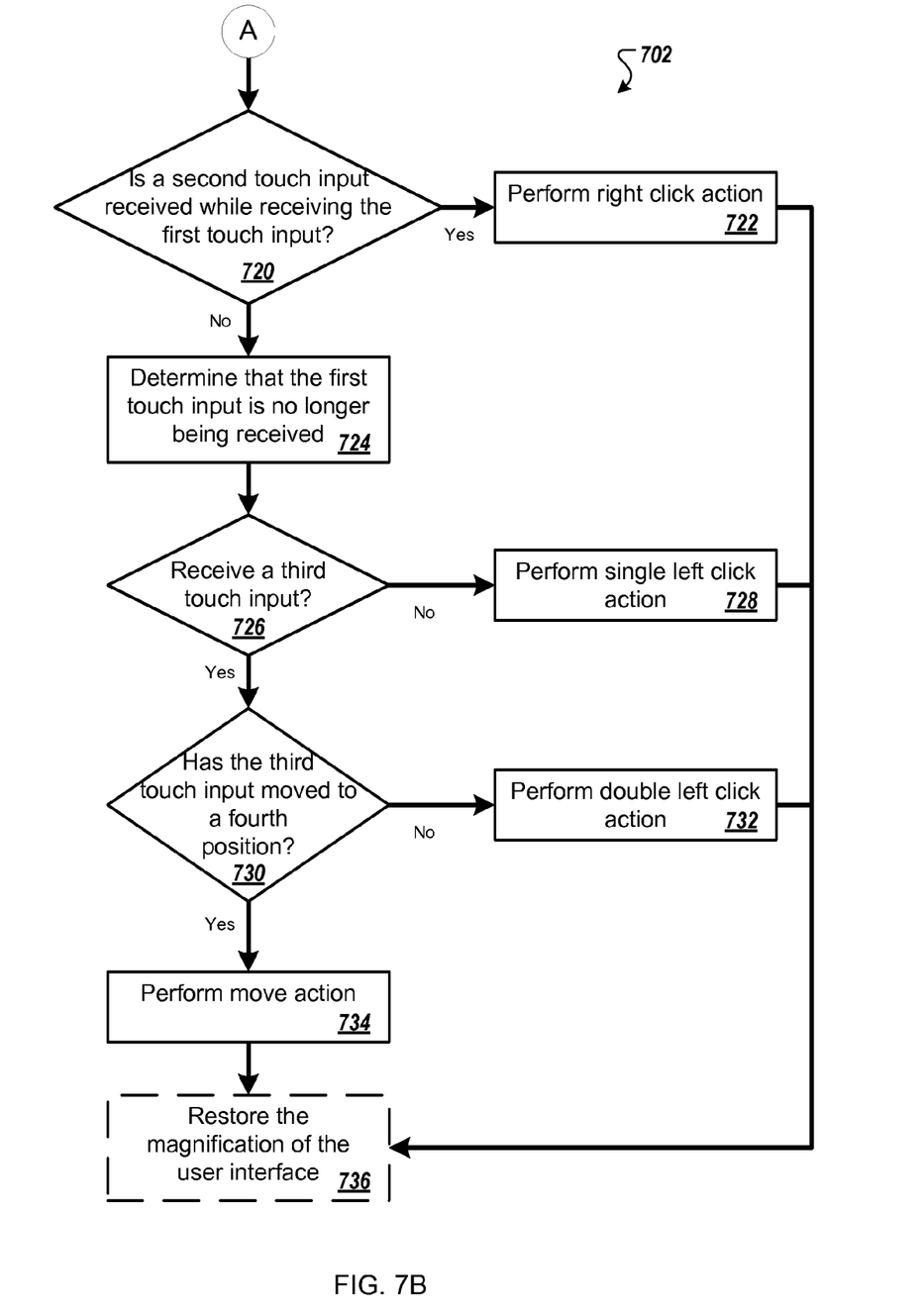

FIGS. 7A-B are a flow diagram of a process 700 for increasing a magnification of a user interface and performing an action. For example, the process 700 can be performed by a user device, e.g., the user device of FIG. 6. The user device can be configured to perform the process 700 by virtue of executing a remote desktop client, e.g., the remote desktop client A 606 from the environment 600 of FIG. 6.

At 702, the user device receives a first touch input at a first position in a user interface presented by the user device on a touch screen display. The first position may be represented by display coordinates, e.g., x and y coordinates.

At 704, the user device determines that the touch screen display continues to receive the first touch input and, at 706, the user device determines that a duration of the first touch input has exceeded a predetermined threshold duration. The user device performs steps 706 through 720 of the process 700 while continuing to receive the first touch input.

At 708, the user device identifies a portion of the user interface that includes the first position. The portion has a first magnification. The portion may or may not be centered on the first position.

In some implementations, the portion is the entire user interface. In some implementations, the portion has a predetermined size. In these implementations, the user device may select the portion so that the first position is approximately centered in the portion, e.g., along one or both axes. For example, when the first position is near a vertical edge of the user interface, the first position may be approximately centered in the portion along a vertical axis and not a horizontal axis.

At 710, the user device determines that the portion includes selectable content. For example, the user device may determine that the portion includes content with which a user may interact, e.g., a menu, a menu item, or a close window user interface element, before performing step 712. In some implementations, the user device may determine that the portion includes both selectable content and non-selectable content, e.g., an image.

At 712, the user device increases the magnification of the user interface to a second magnification. In some implementations, the user device increases the magnification of only the identified portion.

In some implementations, the user device maintains the alignment of the first position in the user interface with the position of the first touch input on the touch screen display. For example, the exact position on the touch screen display of the first touch input may move slightly while the magnification of the portion changes, e.g., based on the movement of a user's finger, and the user device adjusts the location of the first position with respect to the touch screen display to correspond with the minor movement of the first touch input.

At 714, the user device determines whether the first touch input has moved more than a predetermined threshold amount while the first touch input is continuously received by the touch screen display, e.g., without a user removing their finger from the touch screen display. For example, the user device determines whether a change in the position of the first touch input received by the touch screen display was likely intentional or not based on a distance between the first position and a new position of the first touch input.

At 716, based on determining that the first touch input has not moved more than the predetermined threshold amount, the user device determines whether the magnification is a maximum magnification. For example, the user device determines whether the magnification of the user interface cannot be increased further or whether the current magnification is a maximum magnification based on a setting, e.g., a user defined setting or as defined by system settings for the user device.

At 718, based on determining that the first touch input has moved more than a predetermined threshold amount or based on determining that the magnification is a maximum magnification, the user device determines that the magnification of the user interface should remain constant. For example, the user device maintains the magnification of the user interface at the second magnification while the touch screen display continues to receive the first touch input.

When the user device maintains the magnification of the user interface at the second magnification based on movement of the first touch input, the user device may allow a user to adjust the position of the first touch input with respect to the content presented in the user interface. As the magnification increases the user may determine that the first position of the first touch input was incorrect and move the first touch input accordingly.

In some implementations, the user interface may determine that the second magnification is not the maximum magnification, e.g., perform step 716, and increase the magnification of the portion to a third magnification, e.g., perform step 712.

At 720, as shown in FIG. 7B, the user device determines whether a second touch input is received while receiving the first touch input, and at 722, based on determining that a second touch input is received while receiving the first touch input, the user device performs a right click action. The user device performs the right click action when the touch screen display no longer receives the first touch input and the second touch input. The right click action may be associated with the last position of the first touch input in the touch screen display or the last position of the second touch input in the touch screen display. The position associated with the right click action may be based on a right click setting, e.g., defined by a user or the user device, that associates the action with the last position of the first touch input or the second touch input.

The user device may perform the action by executing a right click action on the user device or by sending data that represents a right click action to a server that executes the right click action and provides the user device with an update to the user interface.

For example, the user device or the server may store data, e.g., in a database, that associates the sequence of receipt of a first touch input and a second touch input, while continuing to receive the first touch input, with a right click action. The user device or the server may query the database with the sequence of received touch input to determine the action associated with the sequence of received touch input. In some implementations, different sequences of touch input may correspond with a right click action and/or the receipt of a first touch input and a second touch input while continuing to receive the first touch input may correspond with a different action.

At 724, based on determining that a second touch input is not received while receiving the first touch input, the user device determines that the first touch input is no longer being received. For example, the user device determines that the user has removed their finger from the touch screen display.

At 726, the user device determines whether a third touch input is received, and at 728, based on determining that the third touch input was not received, the user device performs a single left click action. For example, the user device may perform the single left click action upon determining that no additional touch input was received, e.g., the third touch input, within a predetermined period of time after the touch screen display no longer receives the first touch input.

The single left click action may be performed at a last position of the first touch input. For example, a user may slightly move their finger while the user device increases the magnification of the portion, e.g., accidently or intentionally, while maintaining contact between their finger and the touch screen display and the user device performs the single click action at the last position of the first touch input.

The user device may perform the action by executing a single click action on the user device or by sending data that represents a single click action to a server that executes the single click action and provides the user device with an update to the user interface.

At 730, based on determining the third touch input was received, the user device determines whether the third touch input has moved to a fourth position. For example, the user device determines that the third touch input, received at a third position, indicates user selection of a double click action and determines whether the third touch input has moved to the fourth position while the touch screen display continues to receive the third touch input, indicating a move content action.

At 732, based on determining that the third touch input has not moved to the fourth position, the user device performs a double left click action. The user device performs the double left click action after the touch screen display no longer receives the third touch input. For example, the user device may determine that the touch screen display receive the third touch input within a predetermined period of time after the first touch input and perform the double left click action.

The user device may perform the action by executing a double click action on the user device or by sending data that represents a double click action to a server that executes the double click action and provides the user device with an update to the user interface.

At 734, based on determining that the third touch input has moved to the fourth position, the user device performs a move action. For example, the user device may determine that the touch screen display received the third touch input within a predetermined period of time after the first touch input and perform a double click and move action.

The user device may perform similar move actions for the right click based on movement of the first touch input on the touch screen display after receipt of the second touch input.

The user device may perform the action by executing a move action on the user device or by sending data that represents a move action to a server that executes the move action and provides the user device with an update to the user interface. In some implementations, the user device provides the server with continuous updates for the move action and receives continuous updates for the user interface to present the movement of the content with which the user is interacting.

At 736, the user device restores the magnification of the user interface. The user device may gradually restore the magnification of the user interface before, after, or while performing an action. In some examples, the user device determines that the first touch input is no longer being received and restores the magnification of the user interface to the first magnification. In some examples, the user device may send data identifying the action to a server, receive an update to the user interface, and restore the magnification of the user interface while updating the user interface based on the received update. In some implementations, the restoring of the magnification can be performed by gradually decreasing the magnification, e.g., slowly "zooming out," until the magnification has reached the original magnification, e.g., the first magnification.

The order of steps in the process 700 described above is illustrative only, and increasing the magnification of the portion of the user interface and performing the action can be performed in different orders. For example, the user device may identify the portion of the user interface that includes the first position, determine that the position includes selectable content, and then determine that the duration of the first touch input is greater than the predetermined threshold duration, e.g., perform step 706 after steps 708 and/or 710.

In some implementations, the process 700 can include additional steps, fewer steps, or some of the steps can be divided into multiple steps. For example, the user device may perform steps 702 through 706 and 712 through 734 without performing steps 708, 710, and 736.

In some implementations, the user device may determine that the first touch input moved to a fifth position in the user interface once the user interface is at a maximum magnification and may perform any of the actions at the fifth position instead of the first position. For example, the first touch input may indicate a move action of content from the fifth position to a sixth position, e.g., based on receipt of input associated with a double click or a right click.

In some implementations, the user device performs an action based on determining that no additional touch input was received. For example, the user device may determine that the correct type of input was received for a specific action, e.g., a single touch input for a left click or two touch sequential inputs for a double click, and if additional input was received, e.g., three sequential touch inputs, not perform any action.

In some implementations, the user device performs an action based on a different sequence of touch input. For example, a single click may be represented by receipt of a second touch input while continuing to receive a first touch input, e.g., determined at step 720.

Figure 8:
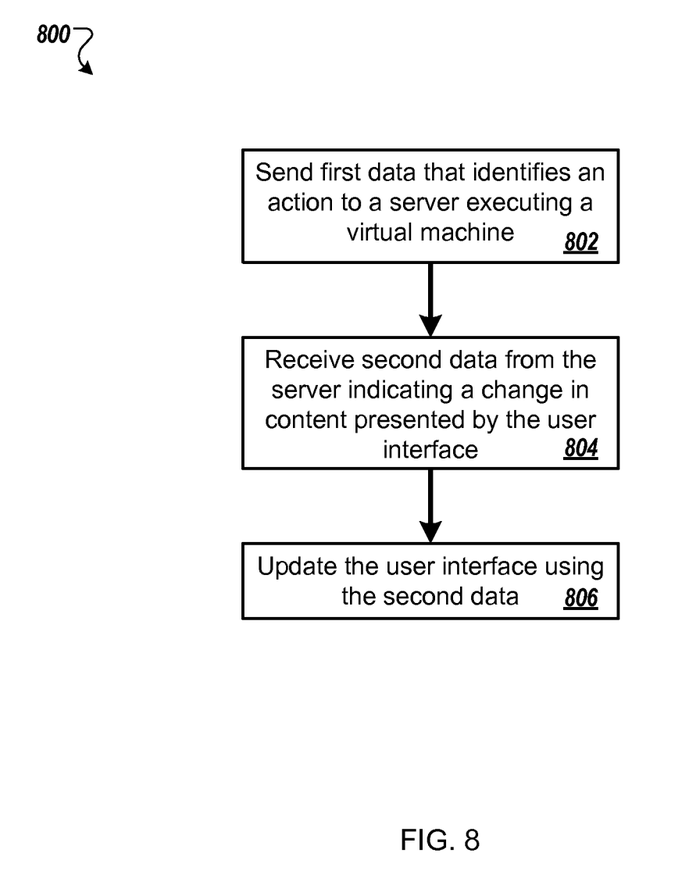
FIG. 8 is a flow diagram of a process for updating a user interface based on data received from a server.

FIG. 8 is a flow diagram of a process 800 for updating a user interface based on data received from a server. For example, the process 800 can be performed by the user device A 606 from the environment 600 of FIG. 6. The user device may perform the process 800 as part of one or more of the steps of the process 700.

At 802, the user device sends first data that identifies an action to a server executing a virtual machine. The first data may identify a position in a user interface of the user device where a touch screen display received a touch input. The first data may represent the touch input received by the user device, e.g., a sequence of touch inputs, or a specific action that corresponds with the touch input, e.g., determined by the user device. For example, a given sequence of touch inputs, either the sequences described above or different sequences, may represent a left click, a right click, a double click, a move action, or another action.

At 804, the user device receives second data from the server indicating a change in content presented by the user interface. For example, the server may execute the identified action with respect to the corresponding position in the user interface and provides the user device with instructions for updating the user interface based on the execution of the action.

At 806, the user device updates the user interface using the second data.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a first touch input contacting a touch screen display of a user device at a first position in a user interface presented at a first magnification;
while continuing to receive the first touch input:
determining that a duration of the first touch input has exceeded a predetermined threshold duration; and
increasing, based on determining that the duration of the first touch input has exceeded the predetermined threshold duration, the magnification of the user interface to a second magnification;
determining, while the magnification of the user interface remains constant at the second magnification, that the first touch input maintained contact with the touch screen display while moving to a second position in the magnified user interface; and
performing an action for content presented in the magnified user interface at the second position.

2. The method of claim 1, comprising determining, while continuing to receive the first touch input, a portion of the user interface that is centered on the first position, wherein increasing the magnification of the user interface to the second magnification comprises increasing the magnification of the user interface to the second magnification while maintaining the portion of the magnified user interface centered at the first position along at least one of a horizontal axis or a vertical axis.

3. The method of claim 1, wherein performing the action for the content presented in the magnified user interface at the second position comprises:
determining that the touch screen display is no longer receiving the first touch input; and
performing a single left click action at the second position.

4. The method of claim 1, wherein performing the action for the content presented in the magnified user interface at the second position comprises:
receiving, while the magnification of the user interface remains constant at a predetermined maximum magnification and while receiving the first touch input, a second touch input in the magnified user interface; and
performing a right click action at the second position.

5. The method of claim 1, wherein performing the action for the content presented in the magnified user interface at the second position comprises:
determining that the touch screen display is no longer receiving the first touch input;
receiving a second touch input at a third position in the magnified user interface;
determining that the second touch input has been received within a predetermined period of time after determining that the touch screen display is no longer receiving the first touch input; and
performing a double left click action at the third position, wherein the third position is located in the magnified user interface.

6. The method of claim 5, wherein the magnified user interface comprises a movable content item at the third position, the method further comprising:
determining that the second touch input has moved to a fourth position in the magnified user interface; and
moving the movable content item from the third position to the fourth position in the magnified user interface.

7. The method of claim 1, further comprising:
determining that the user interface includes selectable content in a portion of the user interface that includes the second position, wherein increasing the magnification of the user interface to the second magnification is based on determining that the user interface includes the selectable content in the portion.

8. The method of claim 1, comprising:
receiving, from a server that is executing a virtual machine remotely from the user device, a user interface for the virtual machine; and
presenting the user interface at a first magnification in response to receiving the user interface for the virtual machine.

9. The method of claim 8, wherein performing the action for content presented in the magnified user interface at the second position comprises:
sending first data that identifies the action and the second position to a server executing the virtual machine;
receiving second data from the server indicating a change in content presented by the virtual machine, the change based on the action; and
updating the user interface using the second data.

10. The method of claim 1, comprising:
determining that the touch screen display has not received another touch input for a predetermined period of time after termination of the first touch input; and
returning the magnification of the user interface to the first magnification in response to determining that the touch screen display has not received another touch input for the predetermined period of time after termination of the first touch input.

11. The method of claim 1, comprising determining a portion of the user interface that is centered on the first position, wherein increasing the magnification of the user interface to the second magnification comprises increasing the magnification of the user interface to the second magnification while maintaining the portion of the magnified user interface centered at the first position along a horizontal axis and a vertical axis.

12. The method of claim 1, comprising determining, using at least the first touch input, a type of action to perform for content presented in the magnified user interface at the second position, the type of action selected from a group comprising at least a single left click action, a double left click action, a right click action, or a move action, wherein performing an action for the content presented in the magnified user interface at the second position comprises performing the determined type of action for the content presented in the magnified user interface at the second position.

13. A device comprising:
a touch screen display presenting a user interface; and
a data processing apparatus programmed to perform operations comprising:
receiving a first indication of a first touch input contacting the touch screen display at a first position in the user interface, wherein the user interface is presented at a first magnification;
while continuing to receive the first indication:
determining that a duration of the first touch input has exceeded a predetermined threshold duration; and
increasing, based on determining that the duration of the first touch input has exceeded the predetermined threshold duration, the magnification of the user interface to a second magnification;

determining, while the magnification of the user interface remains constant at the second magnification, that the first touch input maintained contact with the touch screen display while moving to a second position in the magnified user interface; and
performing an action for content presented in the magnified user interface at the second position.

14. The device of claim 13, wherein performing the action for the content presented in the magnified user interface at the second position comprises:
determining, when the data processing apparatus no longer receives the first indication, that the touch screen display is no longer receiving the first touch input; and
performing a single left click action at the second position.

15. The device of claim 13, wherein performing the action for the content presented in the magnified user interface at the second position comprises:
receiving, while the magnification of the user interface remains constant at a predetermined maximum magnification and while receiving the first indication, a second indication of a second touch input in the magnified user interface; and
performing a right click action at the second position.

16. The device of claim 13, wherein performing the action for the content presented in the magnified user interface at the second position comprises:
determining, when the data processing apparatus no longer receives the first indication, that the touch screen display is no longer receiving the first touch input;
receiving a second indication of a second touch input at a third position in the magnified user interface;
determining that the second touch input has been received within a predetermined period of time after determining that the touch screen display is no longer receiving the first touch input; and
performing a double left click action at the third position, wherein the third position is located in the magnified user interface.

17. The device of claim 13, comprising:
receiving, from a server that is executing a virtual machine remotely from the device, a user interface for the virtual machine; and
presenting the user interface at a first magnification in response to receiving the user interface for the virtual machine.

18. The device of claim 17, wherein performing the action for content presented in the magnified user interface at the second position comprises:
sending first data that identifies the action and the second position to a server executing the virtual machine;
receiving second data from the server indicating a change in content presented by the virtual machine, the change based on the action; and
updating the user interface using the second data.

19. A non-transitory machine readable storage medium embodying computer software, the computer software causing a computer to perform a method, the method comprising:
presenting a user interface at a first magnification on a touch screen display of the computer;
receiving a first touch input contacting the touch screen display at a first position in the user interface;
while continuing to receive the first touch input:
determining that a duration of the first touch input has exceeded a predetermined threshold duration; and
increasing, based on determining that the duration of the first touch input has exceeded the predetermined threshold duration, the magnification of the user interface to a second magnification;
determining, while the magnification of the user interface remains constant at the second magnification, that the first touch input maintained contact with the touch screen display while moving to a second position in the magnified user interface; and
performing an action for content presented in the magnified user interface at the second position.

20. The machine readable storage medium of claim 19, wherein performing the action for the content presented in the magnified user interface at the second position comprises:
determining that the touch screen display is no longer receiving the first touch input; and
performing a single left click action at the second position.

21. The machine readable storage medium of claim 19, wherein performing the action for the content presented in the magnified user interface at the second position comprises:
receiving, while receiving the first touch input, a second touch input in the magnified user interface; and
performing a right click action at a third position of the second touch input, wherein the third position is located in the user interface.

22. The machine readable storage medium of claim 19, wherein performing the action for the content presented in the magnified user interface at the second position comprises:
determining that the touch screen display is no longer receiving the first touch input;
receiving a second touch input of a third position in the user interface;
determining that the second touch input has been received within a predetermined period of time after determining that the touch screen display is no longer receiving the first touch input; and
performing a double left click action at the third position.

23. The machine readable storage medium of claim 22, wherein the user interface comprises a movable content item at the third position, the method further comprising:
determining that the second touch input has moved to a fourth position in the user interface; and
moving the movable content item from the third position to the fourth position.

24. The machine readable storage medium of claim 19, the method comprising:
receiving, from a server that is executing a virtual machine remotely from the computer, a user interface for the virtual machine; and
presenting the user interface at a first magnification in response to receiving the user interface for the virtual machine.

25. The machine readable storage medium of claim 24, wherein performing the action for content presented in the magnified user interface at the second position comprises:
sending first data that identifies the action and the second position to a second computer executing the virtual machine;
receiving second data from the second computer indicating a change in content presented by the virtual machine, the change based on the performed action;
updating the user interface using the second data; and
presenting the updated user interface.

26. The method of claim 1, wherein increasing, based on determining that the duration of the first touch input has exceeded the predetermined threshold duration, the magnification of the user interface to the second magnification comprises increasing, based on determining that the duration of the first touch input has exceeded the predetermined threshold duration, the magnification of the entire user interface to the second magnification.

* * * * *